United States Patent [19]
Yagi

[11] Patent Number: 6,111,592
[45] Date of Patent: *Aug. 29, 2000

[54] DMA DATA TRANSFER APPARATUS, MOTION PICTURE DECODING APPARATUS USING THE SAME, AND DMA DATA TRANSFER METHOD

[75] Inventor: Hideki Yagi, Sagamihara, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/976,507

[22] Filed: Nov. 24, 1997

[30] Foreign Application Priority Data

Nov. 26, 1996 [JP] Japan ................................ 8-314844

[51] Int. Cl.⁷ .............................. G06F 3/14; G06F 13/38; G06F 13/28
[52] U.S. Cl. ............................... 345/511; 710/29; 710/33; 710/22
[58] Field of Search .................................. 345/511, 202, 345/526, 333, 334; 348/393, 394, 407; 710/29, 33, 22

[56] References Cited

U.S. PATENT DOCUMENTS

| | | | |
|---|---|---|---|
| 5,206,935 | 4/1993 | Sinks et al. | 710/29 |
| 5,581,510 | 12/1996 | Iizuka et al | 369/93 |
| 5,754,884 | 5/1998 | Swamstrom | 710/22 |

FOREIGN PATENT DOCUMENTS 63-29868  2/1988  Japan.

*Primary Examiner*—Daniel H. Pan
*Attorney, Agent, or Firm*—Finnegan, Henderson, Farabow, Garrett & Dunner, L.L.P.

[57] ABSTRACT

When successive DMA transfer is to be performed between a plurality of areas of a memory and a DVD decoder, pairs of start memory addresses and transfer counter values corresponding to the plurality of areas are respectively set in a plurality of DMA register sets. The contents of these DMA register sets are sequentially read in a predetermined order, and a plurality of DMA data transfer operations are repeatedly executed by a DMA controller. Immediately after one DMA data transfer is completed, next DMA data transfer starts in accordance with the contents of the next DMA register set. Successive DMA data transfer can be executed continuously.

21 Claims, 9 Drawing Sheets

DMA DATA TRANSFER APPARATUS, MOTION PICTURE DECODING APPARATUS USING THE SAME, AND DMA DATA TRANSFER METHOD

BACKGROUND OF THE INVENTION

The present invention relates to a DMA data transfer apparatus used in a computer system, a motion picture decoding apparatus using the same, and a DMA data transfer control method.

In recent years, with the advance in computer technology, various multimedia personal computers have been developed. A personal computer of this type can reproduce not only text data and graphics data but also motion picture data and audio data.

Generally, motion picture data is compressed and encoded in accordance with the MPEG 1, and stored in a CD (Compact Disk) or the like. The motion picture data is decoded, displayed, and reproduced using a dedicated expansion board. As an expansion board for decoding, displaying, and reproducing motion picture data, e.g., "REAL Magic" available from Sigma Designs, Inc., U.S.A. is well known. This "REAL Magic" has a video decode function complying with the MPEG 1 standard. The decoded motion picture data is synthesized with VGA graphics received from a video card via a feature connector, and the synthesized motion picture is displayed.

The MPEG 1 standard, however, assumes the use of a CD having a data transfer rate of about 1.5 Mbps. Processing motion picture data containing a large amount of image data such as a movie leads to a degradation in image quality, and the like.

Recently, a DVD (Digital Versatile Disk) has been developed as a new-generation storage medium having a data transfer rate about several to several ten times higher than that of the CD. The DVD has a new video disk standard capable of recording video data such as a movie with a high image quality on an optical disk having the same size as that of the CD by using motion picture coding called the MPEG 2. A recording/reproducing method for the DVD is based on variable rate coding in order to ensure both the image quality and the recording time with respect to the capacity. The amount of variable-rate encoded data depends on the quality of an original image. A more abruptly changing scene requires a larger data amount.

When video data stored in the DVD is to be reproduced on a personal computer, the data must be read from a DVD-ROM in the main memory of the computer, and transferred to a DVD decoder. In this case, the data is normally transferred from the main memory to the DVD decoder using a DMA (Direct Memory Access) data transfer scheme in order to reduce the load of the CPU.

DMA data transfer starts when the start memory address of a data area subjected to data transfer, and a transfer counter value indicating the data size of the area are set in a DMA controller, and then the DMA controller is instructed to start DMA data transfer. Completion of the DMA data transfer is recognized based on a hardware interrupt to the CPU, a change in state of the DMA controller, or the like. In successively performing DMA data transfer of another areas of the main memory, after completion of the first DMA data transfer is detected, the start memory address of a data area subjected to next data transfer, and a transfer counter value indicating the data size of the area must be set again in the DMA controller, and the DMA controller must be instructed to start DMA data transfer. FIG. 1 shows the procedure of this DMA transfer.

As is apparent from FIG. 1, when DMA data transfer of a plurality of areas is successively performed, an idle time is necessarily generated between completion of one DMA data transfer and start of next DMA data transfer. In FIG. 1, a time interval between timings (3) and (4) is an idle time. This idle time is a time required for the CPU to recognize completion of DMA transfer and set the start memory address and transfer counter value of the next data area in the DMA controller again after the DMA data transfer is completed.

The length of the idle time is not constant but varies depending on a hardware interrupt state or the load of the CPU at that time. Depending on the length of the idle time, originally intended data processing may not be correctly performed. For example, when data requiring a high transfer rate such as the above-mentioned MPEG 2 motion picture data is to be transferred to the DVD decoder, the data transfer to the DVD decoder is interrupted. Interruption of the data transfer leads to distortion of a reproduced image or frame omission. Further, decoding itself cannot be continuously performed.

As described above, if successive DMA data transfer is performed by the conventional DMA data transfer scheme, an idle time is generated between completion of DMA data transfer and start of next DMA data transfer. For this reason, if data requiring a high transfer rate such as MPEG 2 motion picture data stored in the DVD is to be transferred by the conventional DMA data transfer scheme, the data transfer to the DVD decoder is interrupted. Interruption of the data transfer results in distortion of a reproduced image or frame omission. Further, decoding itself cannot be continuously performed.

BRIEF SUMMARY OF THE INVENTION

It is an object of the present invention to provide a DMA data transfer apparatus capable of continuously executing successive DMA data transfer, a motion picture decoding apparatus using the same, and a DMA data transfer control method.

According to the present invention, there is provided a DMA data transfer apparatus arranged in an I/O device of a computer system to perform DMA data transfer between a memory of the computer system and the I/O device, comprising a plurality of DMA setting register sets programmable by a CPU of the computer system, each DMA setting register set having a parameter set necessary for performing DMA data transfer, and DMA data transfer means for sequentially referring to the plurality of DMA setting register sets in a predetermined order to repeatedly execute DMA data transfer, the DMA data transfer means starting DMA data transfer in accordance with contents of a next DMA setting register set upon completion of DMA data transfer in accordance with contents of one DMA setting register set.

The DMA data transfer apparatus is used to operate the I/O device mounting it as a bus master, and executes data transfer between the memory of the computer system and the I/O device in the DMA mode. When successive DMA transfer is to be performed between a plurality of areas of the memory and the I/O device, pairs of start memory addresses and transfer counter values corresponding to the plurality of areas (or pairs of start memory addresses and end addresses) are respectively set in the DMA setting register sets. The contents of the DMA setting register sets are sequentially referred to in a predetermined order, and a plurality of DMA data transfer operations are repeatedly executed. Immediately after one DMA data transfer is completed, next DMA data transfer starts in accordance with the contents of the next DMA setting register set. Therefore, no idle time is generated between completion of DMA data transfer and start of next DMA data transfer, and successive DMA data transfer can be executed continuously.

For this reason, if a motion picture decoding apparatus is operated as a bus master by arranging the above-described DMA data transfer apparatus in the motion picture decoding apparatus for decoding motion picture data requiring a high transfer rate such as MPEG 2 motion picture data stored in a DVD, interruption of data transfer from the memory to the decoder can be prevented, and the motion picture data can be decoded and reproduced efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the several views of the accompanying drawing.

Figure 2:
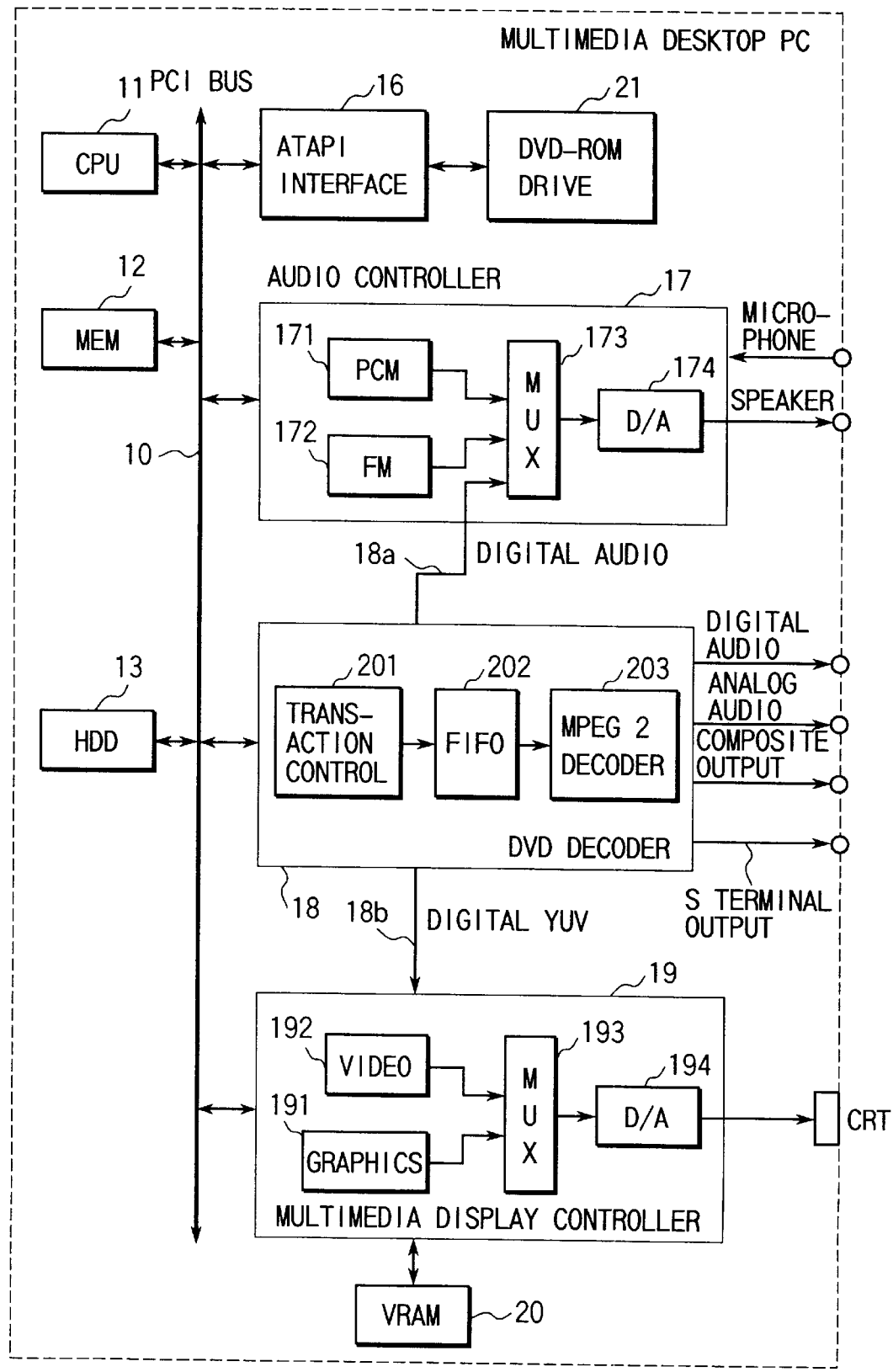
FIG. 2 is a block diagram showing the arrangement of a computer system having a DMA data transfer apparatus according to an embodiment of the present invention.

FIG. 2 shows the system arrangement of a personal computer according to an embodiment of the present invention. This system conforms to a desktop personal computer, which comprises a PCI bus 10, a CPU 11, a main memory (MEM) 12, an HDD 13, a DVD interface 16 constituted by an ATAPI or SCSI interface, an audio controller 17, a DVD decoder 18, a multimedia display controller 19, and a video memory (VRAM) 20, as shown in FIG. 2. A DVD-ROM drive 21 storing motion picture data and the like encoded in accordance with the MPEG 2 is connected to the DVD interface 16.

The DVD-ROM drive 21 reads a data stream stored in a DVD having a storage capacity of about 10 GB for two disk surfaces at a maximum transfer rate of 10.08 Mbps. An SCR (System Clock Reference) representing the read time is written in the data stream recorded on the DVD medium for each sector having a fixed length (2,048 bytes). Based on this SCR, the decode timing in the decoder is controlled.

Figure 1:
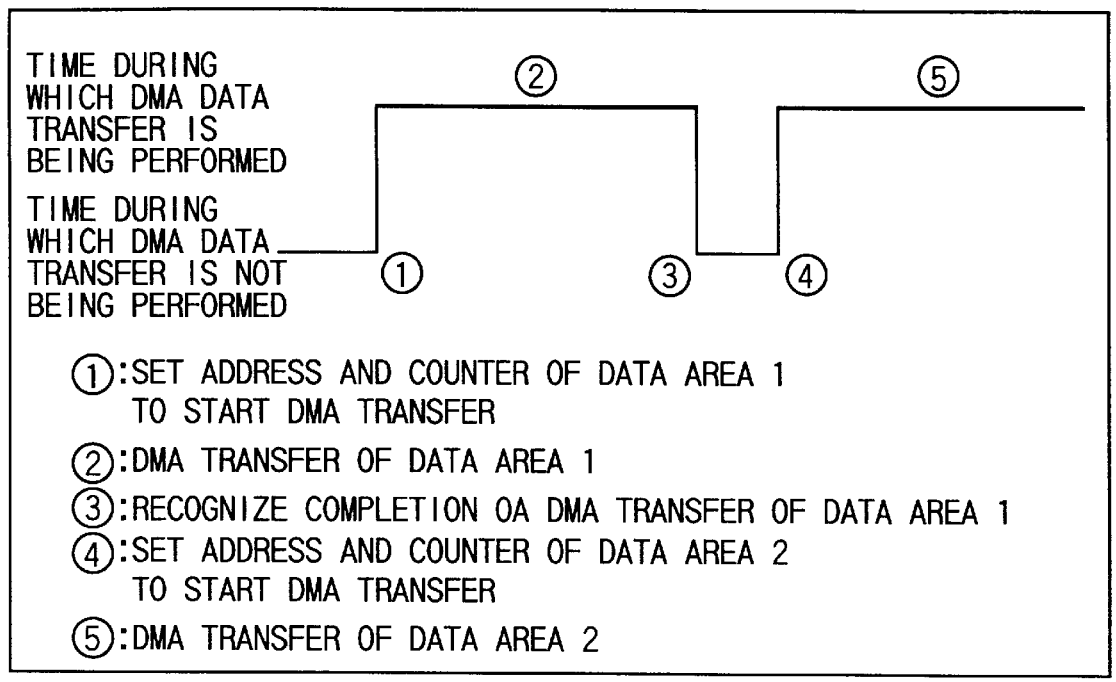
FIG. 1 is a timing chart showing a conventional DMA data transfer operation.
Figure 3:
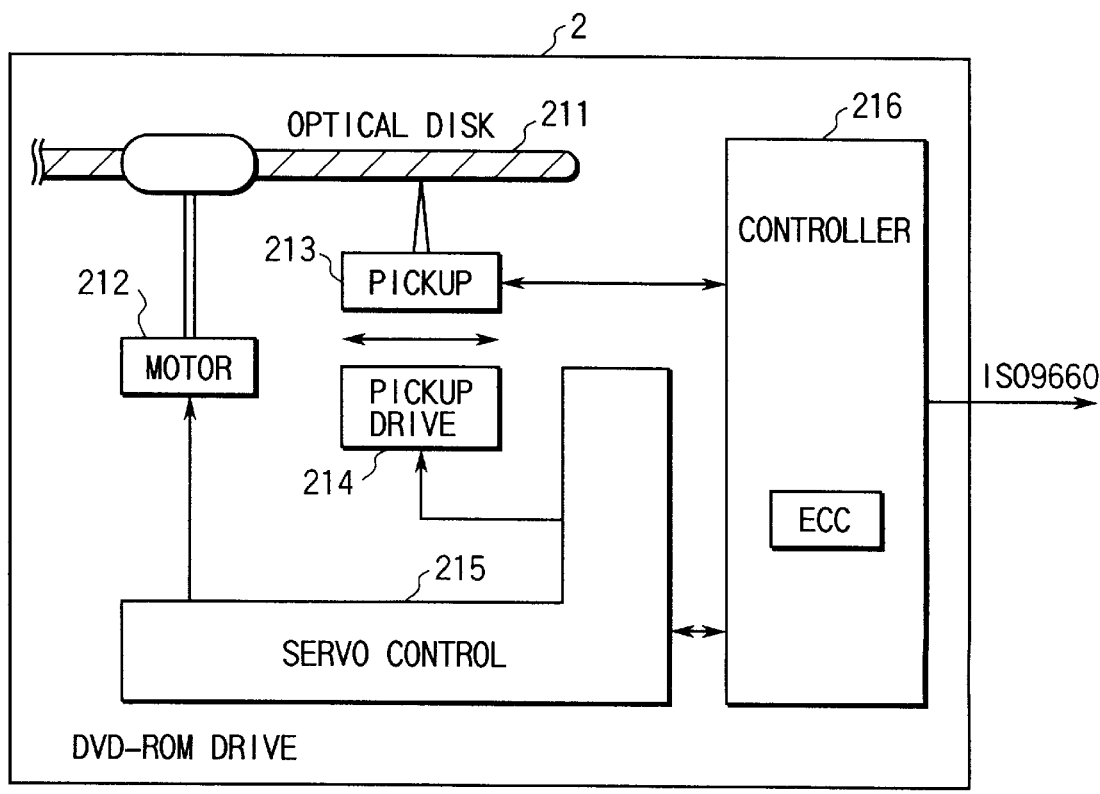
FIG. 3 is a block diagram showing the arrangement of a DVD-ROM drive used in the system of this embodiment.

As shown in FIG. 3, the DVD-ROM drive 21 is constituted by a DVD medium 211 constituted by an optical disk, a motor 212, a pickup 213, a pickup drive 214, a servo controller 215, and a drive controller 216 including an ECC circuit for detecting and correcting an error. The motor 212, the pickup 213, the pickup drive 214, the servo controller 215, and the drive controller 216 function as a drive device for driving the DVD medium 211 and reading data recorded on the DVD medium 211.

A movie about 135 min can be recorded on one surface of the DVD medium 211. The movie data can include a main video image (video), subvideo images (subpictures) for up to 32 channels, and sounds (audio) for up to 8 channels.

In the MPEG 2 standard, data encoded by the MPEG 2 can include another encoded data. These encoded data are treated as one MPEG 2 program stream (digital data sequence).

The video is encoded using the MPEG 2, while the subpicture are encoded using run length coding and audio is encoded using the DOLBY AC3 or MPEG. Also in this case, these encoded video, subpicture, and audio are treated as one MPEG 2 program stream.

Coding processing using the MPEG 2 standard is variable bit rate coding, in which the data amount to be recorded/ reproduced per unit time can be changed. Therefore, a more abruptly changing scene can have a higher transfer rate of the MPEG stream constituting a corresponding frame group, thereby reproducing a high-quality motion picture.

Figure 4:
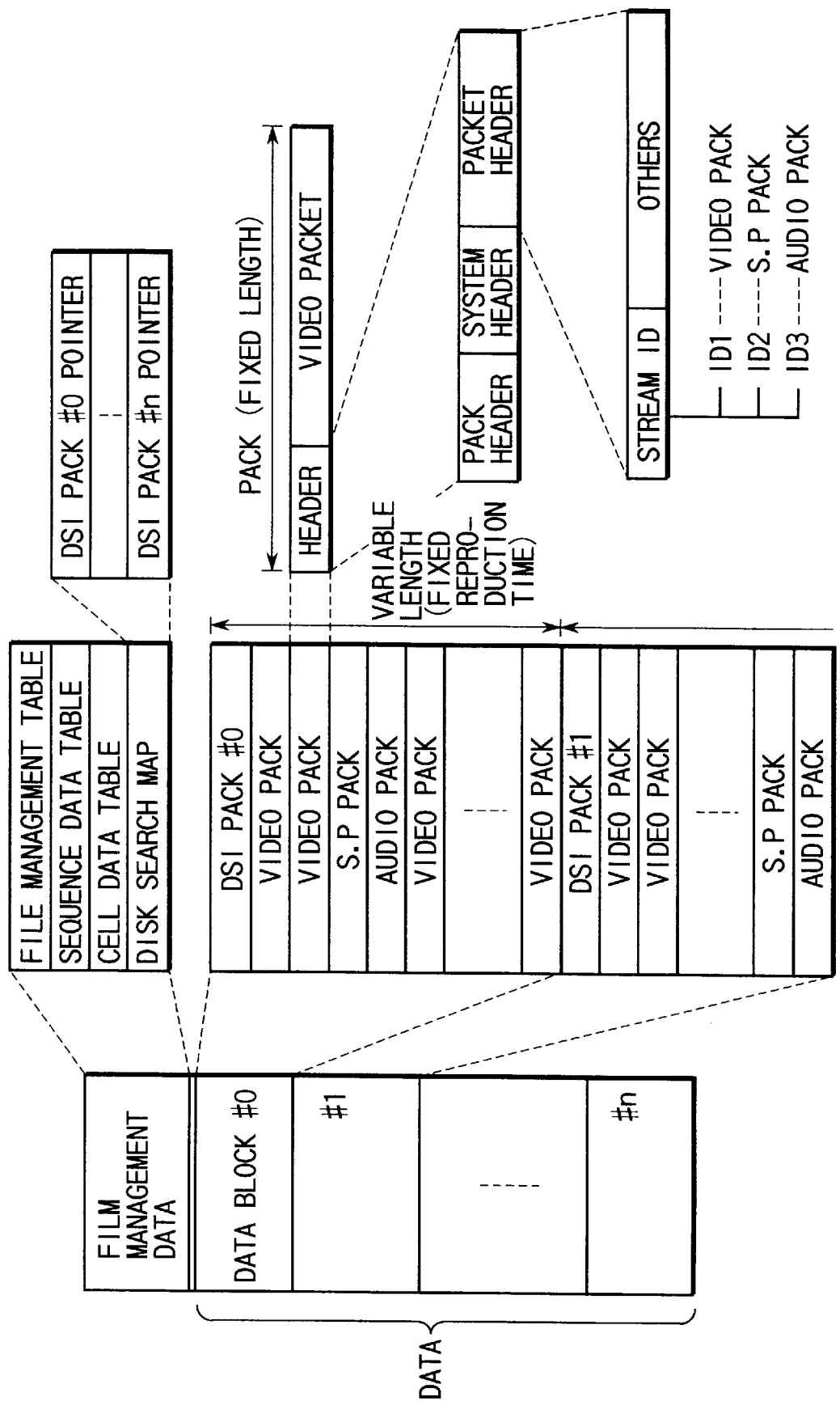
FIG. 4 is a view showing an example of the recording format of motion picture data used in the system of this embodiment.

To utilize the feature of the MPEG 2, in this embodiment, video data is recorded on the DVD medium 211 by using a data format like the one shown in FIG. 4.

As shown in FIG. 4, one video data is constituted by a file management data portion and a data portion. The data portion includes many data blocks (blocks #0 to #n). Each data block has a DSI (Disk Search Information) pack at its head end. A portion from a certain DSI pack to the next DSI pack serves as one data block. The storage location of each DSI pack is managed by disk search map data of the file management data portion.

One data block constitutes data corresponding to 15 frames necessary for reproducing a motion picture having a predetermined time, e.g., 0.5 sec, and is equivalent to GOP (Group Of Picture). On each data block, a video pack (VIDEO pack), a subpicture pack (S.P pack), and an audio pack (AUDIO pack) are multiplexed and recorded. These video pack (VIDEO pack), subpicture pack (S.P pack), and audio pack (AUDIO pack) are the data units of encoded video, subpicture, and audio. The data size of each pack corresponds to the above-described sector size, and are fixed. However, the number of packs one data block can include is variable. Therefore, a data block corresponding to an active scene includes a larger number of video packs.

Each of the video, subpicture, and audio packs is constituted by a header portion and a packet portion (video, subpicture, or audio packet). The packet portion is encoded data itself. The header portion is constituted by a pack header, a system header, and a packet header. In the packet header, a stream ID representing that a corresponding packet is a video packet or another private packet is registered. Identification of whether the private packet is a subpicture packet or an audio packet uses a substream ID in the private packet.

The DVD has a multi-story function of selecting a scene group corresponding to a scenario designated by the user from a plurality of scenarios, and reproducing it, and a multi-angle function of selecting the video image of an angle designated by the user from a plurality of video images having different photographing angles, and reproducing it.

These functions are realized by multiplexing a plurality of video images corresponding to multi stories and multi angles in units of, e.g., data blocks, and managing the locations and relations of the data blocks using disk search map data or the like in units of stories or angles.

Each unit of the system in FIG. 2 will be described below.

The CPU 11 controls the operation of the whole system, and executes an operating system stored in the system memory (MEM) 12, and the program of an application to be executed. Data recorded in the DVD-ROM drive 21 is read and reproduced by executing a DVD control driver by the CPU 11.

The DVD interface 16 is a peripheral interface for connecting a peripheral device such as an HDD or a CD-ROM to the PCI bus 10. In this embodiment, the DVD interface 16 performs data transfer between the CPU 11 and the DVD-ROM drive 21. Data read from the DVD-ROM drive 21 via the DVD interface 16 is temporarily stored in the memory 12, and transferred to the DVD decoder 18.

The audio controller 17 controls the input/output of sound data under the control of the CPU 11, and comprises a PCM sound source 171, an FM sound source 172, a multiplexer 173, and a D/A converter 174 in order to output the sound. The multiplexer 173 receives outputs from the PCM sound source 171 and the FM sound source 172, and digital audio data transferred from the DVD decoder 18, and selects one of them. The DVD decoder also comprises a function equivalent to the D/A converter of the audio controller 17, so that an analog audio signal can be directly output without using the audio controller 17.

The digital audio data is obtained by decoding audio data read from the DVD-ROM drive 21. The digital audio data is transferred from the DVD decoder 18 to the audio controller 17 by using not the PCI bus 10 but an audio bus 18a. Therefore, the digital audio data can be transferred at a high speed without influencing the performance of the computer system.

The DVD decoder 18 reads an MPEG 2 program stream from the memory 12 under the control of the CPU 11. After dividing the MPEG 2 program stream into video, subpicture, and audio packets, and extracting the video, subpicture, and audio packets, the DVD decoder 18 decodes, synchronizes, and outputs them. The DVD decoder 18 is implemented as, e.g., a PCI expansion card freely detachable from the PCI expansion slot of this computer system. As shown in FIG. 2, the DVD decoder 18 comprises a transaction control section 201, a FIFO buffer 202, and an MPEG 2 decoder 203. The transaction control section 201 operates the DVD decoder 18 as a bus master (initiator) for sending a transaction onto the PCI bus 10, and executes read of the MPEG 2 program stream from the memory 12 by DMA transfer. The MPEG 2 program stream is sent to the MPEG 2 decoder 203 via the FIFO buffer 202. The MPEG 2 decoder 203 divides the MPEG 2 program stream into video, subpicture, and audio packets, and extracts and decodes them.

The decoded audio data is transferred as digital audio data to the audio controller 17 via the audio bus 18a, as described above, or directly output to an external DSP or the like. The decoded video and subpicture are synthesized and sent as digital YUV data to the digital YUV input port of the display controller 19. In this case, the digital YUV data is transferred from the DVD decoder 18 to the display controller 19 by using not the system bus 10 but a video bus 18b. Therefore, the digital YUV data can also be transferred at a high speed without influencing the performance of the computer system, similar to the digital audio data.

As the video bus 18b, a VESA-standard VAFC (VESA Advanced Feature Connector), a VM-Channel (VESA Media Channel), or an S3-LBP interface can be used.

The DVD decoder 18 also has a function of converting digital YUV data and audio data into a TV signal having the NTSC scheme, and outputting the TV signal to the external video input of a TV receiver. The TV signal can be easily transmitted from the DVD decoder 18 to the TV receiver by connecting a cable extending to the TV receiver to a connector arranged on the card of the DVD decoder 18.

The display controller 19 controls a CRT display used as the display monitor of this system under the control of the CPU 11, and supports display of a text and graphics having the VGA specification, and in addition display of a motion picture.

As shown in FIG. 2, the display controller 19 comprises a graphics display control circuit (Graphics) 191, a video display control circuit 192, a multiplexer 193, a D/A converter 194, and the like.

The graphics display control circuit 191 is a VGA-compatible graphics controller, which converts the VGA graphics data stored in the video memory (VRAM) 20 into RGB video data, and outputs the RGB video data. The video display control circuit 192 has a video buffer for storing digital YUV data, a YUB-RGB conversion circuit for converting YUV data stored in this buffer into RGB video data, and the like.

The multiplexer 193 selects one of output data from the graphics display control circuit 191 and the video display control circuit 192, or synthesizes VGA graphics from the graphics display control circuit 191 and a video output from the video display control circuit 192, and sends them to the D/A converter 194. The D/A converter 194 converts the video data from the multiplexer 193 into an analog RGB signal, and outputs the signal to the CRT display.

Figure 5:
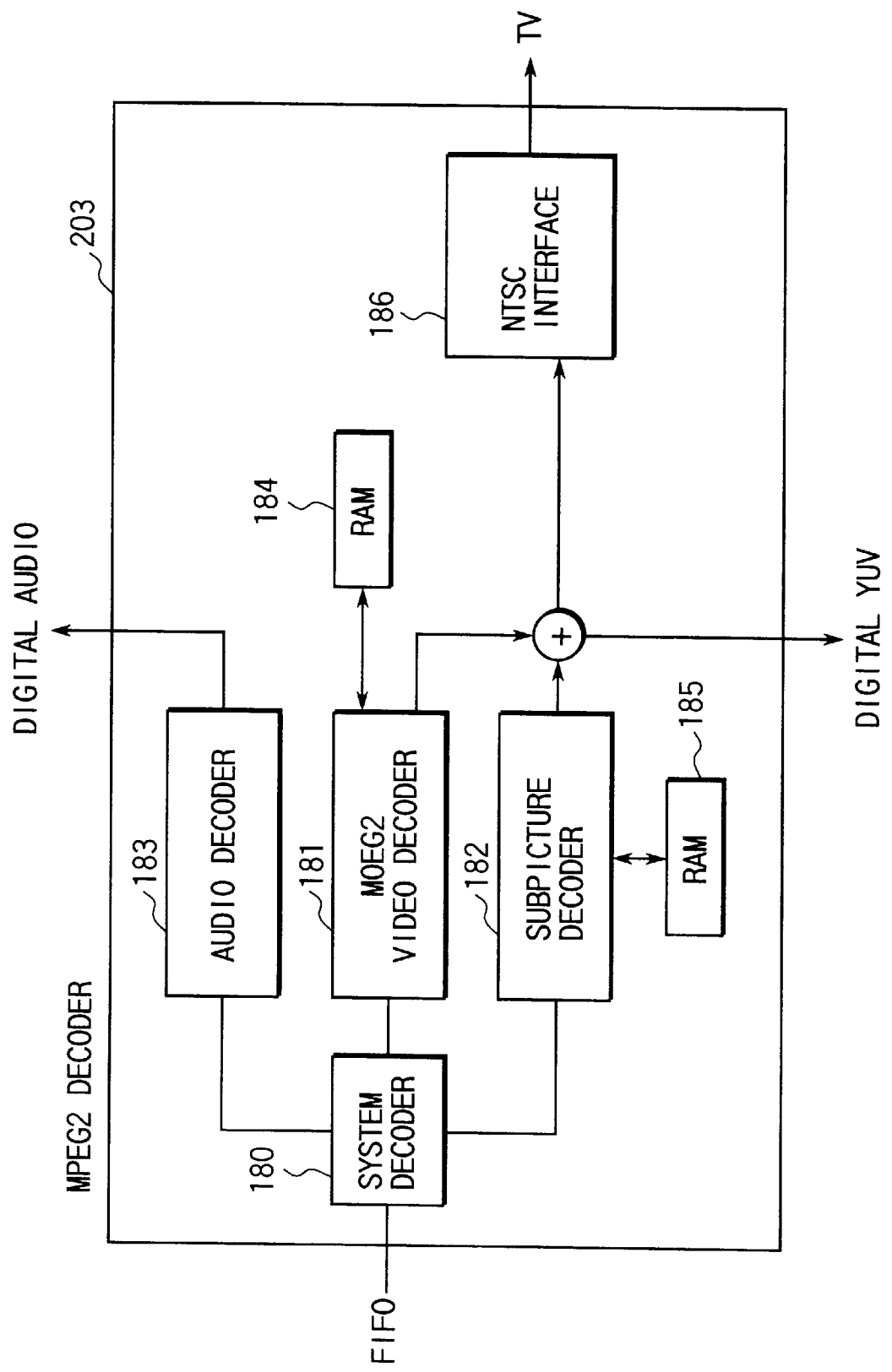
FIG. 5 is a block diagram showing an example of the detailed arrangement of an MPEG 2 decoder arranged inside a DVD decoder used in the system of this embodiment.

FIG. 5 shows a detailed arrangement of the MPEG 2 decoder 203.

In order to synchronously decode and reproduce multiplexed video, subpicture, and audio bit streams, the MPEG 2 decoder 203 comprises a system decoder 180 for dividing a stream, and three decoders corresponding to the video, subpicture, and audio, i.e., an MPEG 2 video decoder 181, a subpicture decoder 182, and an audio decoder 183.

The MPEG 2 video decoder 181 and subpicture decoder 182 respectively have RAMs 184 and 185 used for decoding or the like. The system decoder 180 divides the received MPEG stream into video, subpicture, and audio packs by utilizing a stream ID described with reference to FIG. 4. The MPEG 2 video decoder 181 decodes the video data extracted from the MPEG stream by the system decoder 180. The subpicture and audio packs are respectively sent to the subpicture decoder 182 and the audio decoder 183.

The subpicture decoder 182 decodes the subpicture pack separated by the system decoder 180. The type of decoding executed by the subpicture decoder 182 corresponds to coding processing performed for the subpicture, i.e., runlength coding. The subpicture decoded by the subpicture decoder 182 is synthesized with the video data decoded by the MPEG 2 video decoder 181, and then output as digital YUV data. The synthesis location of the subpicture is determined by location data included in the header portion added to the subpicture packet.

The audio decoder 183 decodes the audio pack separated by the system decoder 180. The type of decoding executed by the audio decoder 183 corresponds to coding processing performed for audio data, i.e., the DOLBY AC3. The decoded audio packet is output as digital audio data.

As described above, the digital YUV data and the digital audio data are sent to the display controller 19 and the audio controller 17. The digital YUV data is further sent to an NTSC interface 186 where it is converted into a TV signal such as a composite signal or an S terminal signal.

The arrangement of the transaction control section 201 will be described with reference to FIG. 6.

The transaction control section 201 performs data transfer from the memory 12 to the MPEG 2 decoder 203 in a DMA transfer mode. The transaction control section 201 is constituted by a plurality of DMA register sets 301-1, 301-2, . . . , 301-N, a data transfer enable/disable register 302, a transfer management section 303, and a DMA controller 304.

The plurality of DMA register sets 301-1, 301-2, . . . , 301-N constitute a register group readable/writable by the CPU 11. In each DMA register set, a start memory address value of the main memory 12 subjected to DMA data transfer, and a transfer count value representing a data transfer width are set as DMA transfer setup data by the CPU 11. For example, when DMA data transfer is to be successively performed for a plurality of areas in the main memory 12, pairs of start memory address values and transfer count values corresponding to these areas are respectively set in the DMA register sets 301-1, 301-2, . . . , 301-N.

The set start memory address value is a physical memory address. The maximum of a data transfer size that the transfer count value can designate is about 1 Mbyte. This data transfer size need only be within the data size of physically successive memory areas. For this reason, the data transfer size can be defined in correspondence with the page size because the CPU 11 normally supports a virtual memory by paging.

The data transfer enable/disable register 302 is a register readable/writable by the CPU 11. In the data transfer enable/ disable register 302, a plurality of DMA transfer control bits designating the enable/disable state of DMA data transfer in accordance with the contents of the register sets are set for the DMA register sets 301-1, 301-2, . . . , 301-N.

The transfer management section 303 sequentially inputs the contents of a register set permitted for DMA data transfer to the DMA controller 304, thereby executing DMA data transfer. The transfer management section 303 refers to a plurality of DMA transfer control bits in the data transfer enable/disable register 302 to sequentially select register sets permitted for DMA data transfer. The contents of a selected register set are input to the DMA controller 304 at the start of the first DMA data transfer. When all the data designated by the register set have been transferred, the contents of the next register set are input to the DMA controller 304.

The DMA controller 304 executes memory read transaction on the basis of a start memory address value and a transfer count value designated by the input contents of the register set. When DMA data transfer of the entire data size designated by the transfer count value is completed, this state is recognized by the transfer management section 303, and a corresponding DMA transfer control bit of the data transfer enable/disable register 302 is reset to be disabled. At the same time, the DVD decoder 18 outputs a hardware interrupt to the CPU 11.

The DMA data transfer operation using the transaction control section 201 is as follows.

When reading data from the DVD-ROM drive 21 in the memory 12, the above-described DVD control driver serving as software that instructs data transfer sets, in each register set, the address and size of each data transfer area in the memory 12, and enables transfer of a bit corresponding to each set of the transfer enable/disable register.

The data transfer management section 303 sets the start memory address and transfer count value of a given set in the DMA controller 304, and starts DMA data transfer. Upon completion of the DMA data transfer, the transfer management section 303 sets the address and count value of the next register set in the DMA controller 304, and starts DMA data transfer. In this manner, every time one DMA data transfer is completed, the transfer management section 303 performs setting of the next register set in the DMA controller 304. On the other hand, the DVD control driver sequentially sets the address of a data area subjected to next DMA data transfer, and a transfer count value (or the start and end addresses of the data area) in a register set having undergone DMA data transfer, and enables transfer of a register bit indicating a transfer enable/disable state corresponding to the register set.

With this processing, a time interval between the completion of DMA data transfer and the start of next DMA data transfer is minimized to almost 0, and an error generated owing to an idle time in data transfer can be eliminated. As a result, data transfer can be continuously performed to reduce the capacity of the FIFO buffer 202.

Figure 7:
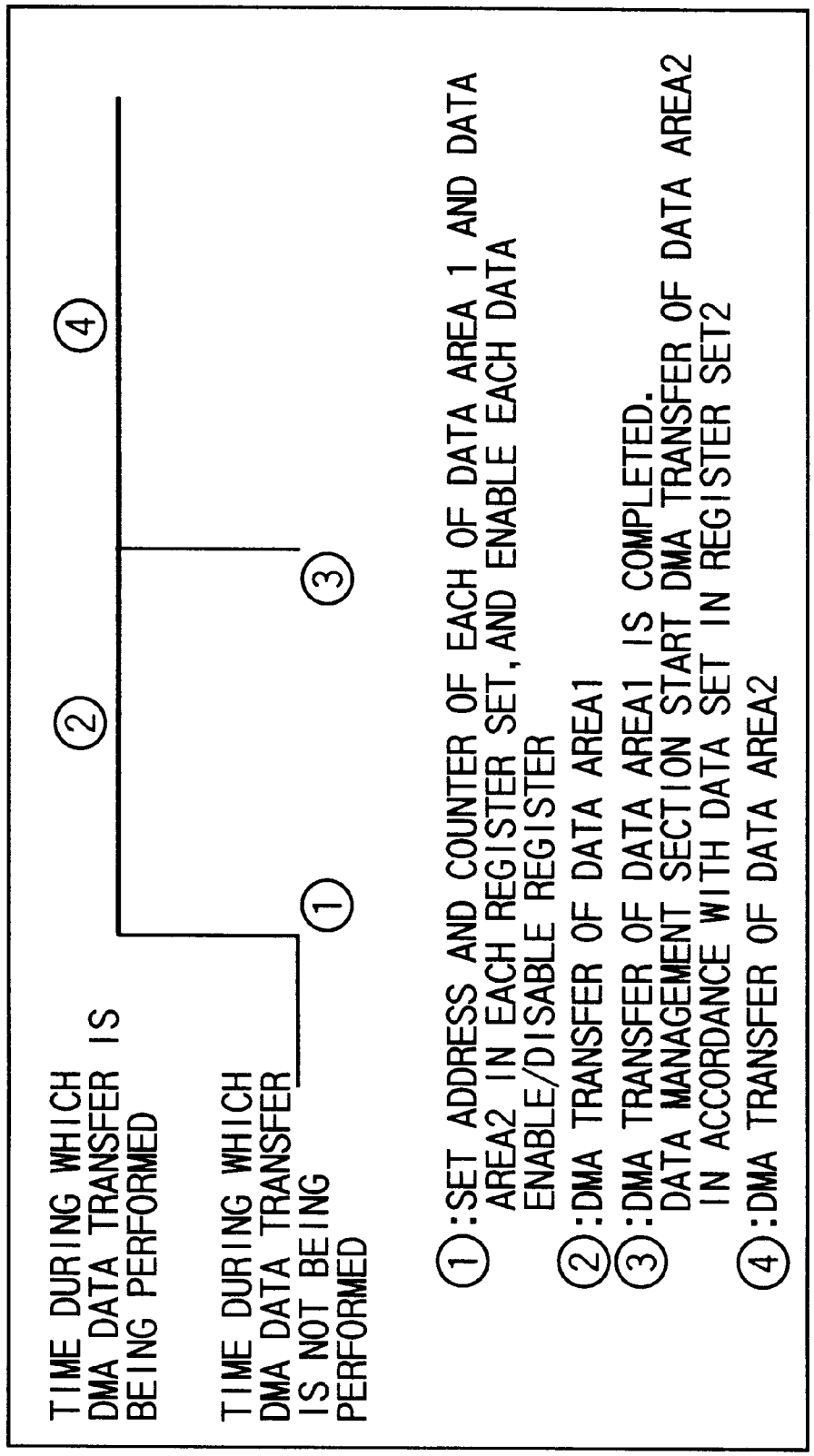
FIG. 7 is a timing chart showing a DMA data transfer operation by the transaction control section in FIG. 6.

FIG. 7 shows an operation timing when DMA data transfer of a plurality of data areas is successively executed.

Figure 8:
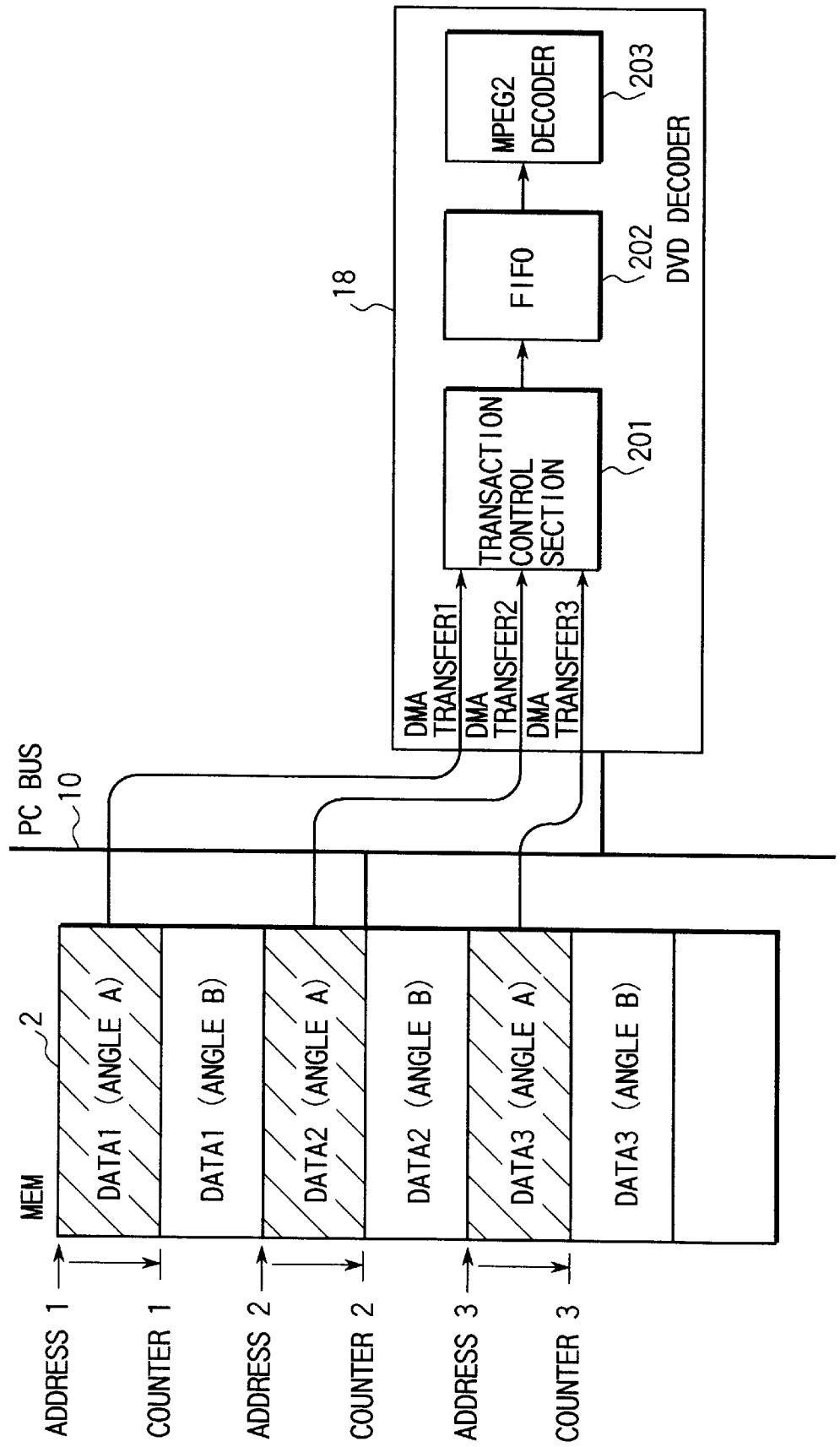
FIG. 8 is a view showing a state wherein motion picture data is transferred to the DVD decoder by the transaction control section in FIG. 6.

In FIG. 7, at timing (1), the start memory addresses and transfer count values of a plurality of data areas subjected to data transfer are set in the register sets 301-1, 301-2, . . . . For example, when a video image of a specific angle designated by the user is to be reproduced, start addresses (address 1, address 2, address 3, . . . ) and data sizes (counter 1, counter 2, counter 3, . . . ) corresponding to the areas of data 1, 2, 3, . . . are set in the register sets 301-1, 301-2, 301-3, . . . , as shown in FIG. 8.

At timing (1), bits that permit transfer of the register sets 301-1, 301-2, 301-3, . . . are set in the data transfer enable/disable register 302.

At timing (2), DMA data transfer is executed for data 1 of angle A in accordance with the contents of the register set 301-1. At timing (3), the data transfer for data 1 of the angle A is completed, and the contents of the register set 301-2 are input to the DMA controller 304. At timing (4), DMA data transfer is executed for data 2 of angle A in accordance with the contents of the register set 301-2.

After the DMA data transfer for data 2 of the angle A is completed, the contents of the register set 301-3 are similarly input to the DMA controller 304, and DMA data transfer is executed for data 3 of angle A.

The procedure of a transfer control operation by the DVD control driver will be explained below with reference to FIGS. 9 and 10.

The transfer control operation by the DVD control driver is realized by a start routine executed at the start of the first transfer, and an interrupt routine executed every time one DMA transfer is completed.

The following description will exemplify a case wherein the transaction control section 201 comprises the two register sets 301-1 and 301-2.

Figure 9:
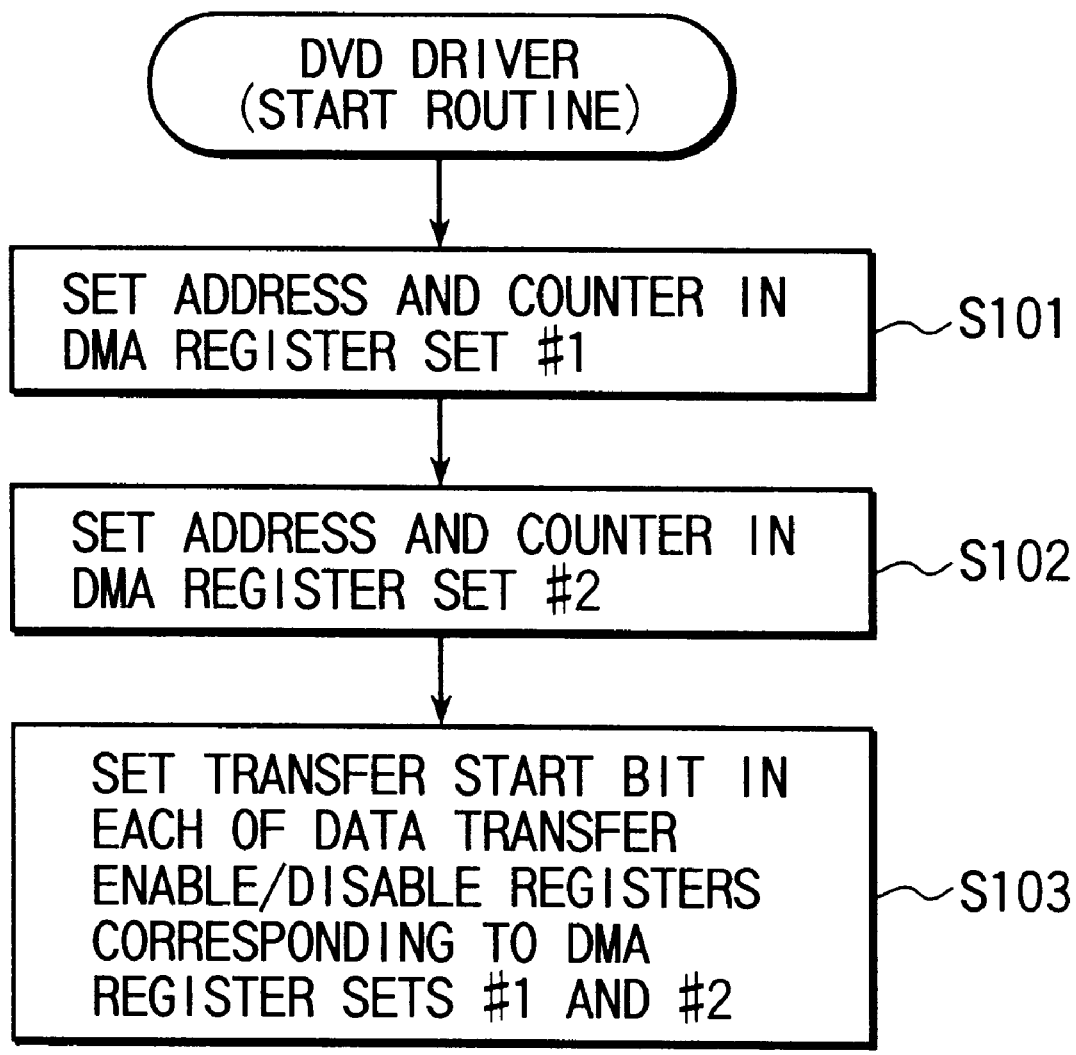
FIG. 9 is a flow chart showing the procedure of DMA data transfer used in the system of this embodiment.
Figure 10:
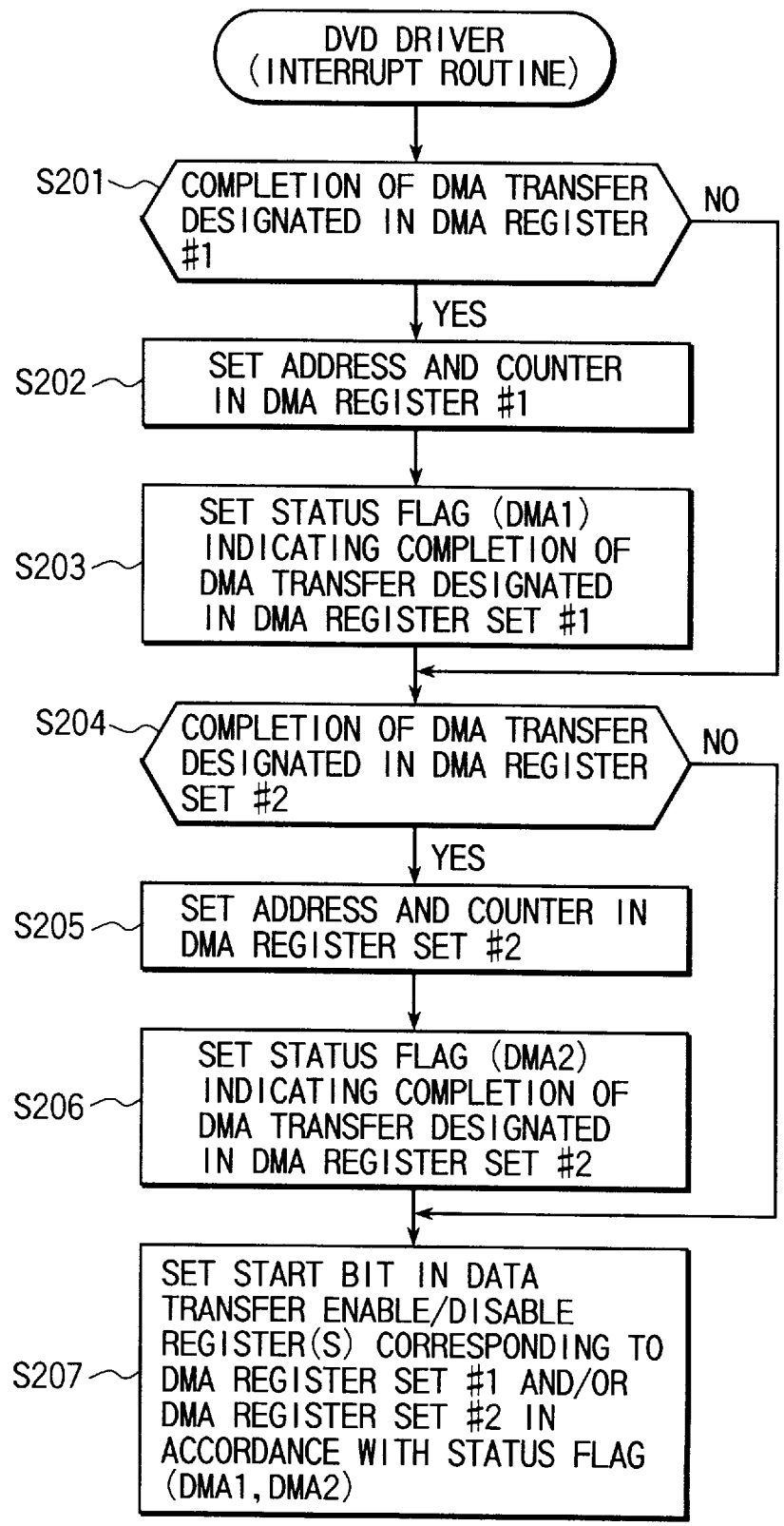
FIG. 10 is a flow chart showing the procedure of DMA data transfer used in the system of this embodiment.

At the start of the first transfer, the DVD control driver sets an address and a counter in the register set 301-1 (step S101), sets an address and a counter in the DMA register set 301-2 (step S102), and then sets bits that permit data transfer corresponding to the DMA register sets 301-1 and 301-2 in the data transfer enable/disable register 302 (step S103), as shown in a flow chart of FIG. 9.

Accordingly, DMA data transfer starts in accordance with the contents of the DMA register set 301-1. Upon completion of the DMA data transfer, a hardware interrupt is input to the CPU 11 to start the interrupt routine in FIG. 10.

In this interrupt routine, whether the DMA transfer designated in the register set 301-1 is completed is determined on the basis of the data transfer enable/disable state of a corresponding bit in the data transfer enable/disable register 302 (step S201). If YES in step S201, the address and counter of the next area are set in the register set 301-1 (step S202), and then a status flag indicating completion of the DMA transfer designated in the register set 301-1 is set in the work area of the memory 12 (step S203).

The same processing is also performed for the register set 301-2. More specifically, in the interrupt routine, whether the DMA transfer designated in the register set 301-2 is complete is determined on the basis of the data transfer enable/disable state of a corresponding bit in the data transfer enable/disable register 302 (step S204). If YES in step S204, the address and counter of the next area are set in the register set 301-2 (step S205), and then a status flag indicating completion of the DMA transfer designated in the register set 301-2 is set in the work area of the memory 12 (step S206).

In accordance with the states of the status flags corresponding to the register sets 301-1 and 301-2 which are set in the work area of the memory 12, bits are set in the data transfer enable/disable register 302 so as to permit DMA transfer corresponding to a register set having undergone DMA transfer (step S207).

In this way, the interrupt routine of the DVD control driver is constituted to check the states of the two register sets, and perform next setting for these register sets every time the interrupt routine is executed. With this arrangement, when the interrupt routine of the DVD control driver is executed, all settings which can be processed at that time are performed because, owing to the load of the CPU 11, generation of another interrupt, or the like, the interrupt routine of the DVD control driver is not always executed immediately after the DVD decoder 18 sends a hardware interrupt.

As has been described above, in this embodiment, the transaction control section 201 executes data transfer between the memory 12 of the computer system and the DVD decoder 18 in the DMA mode in order to operate the DVD decoder 18 as a bus master. In data transfer of the DMA mode, when successive DMA transfer is to be performed between a plurality of areas of the memory 12 and the DVD decoder 18, pairs of start memory addresses and transfer counter values corresponding to the plurality of areas are respectively set in the DMA register sets 301-1 to 301-N (or pairs of start and end memory addresses are set). Then, the contents of the DMA register sets 301-1 to 301-N are sequentially read in a predetermined order, and a plurality of DMA data transfer operations are repeatedly executed by the DMA controller 304. In this case, immediately after one DMA data transfer is completed, next DMA data transfer starts in accordance with the contents of the next DMA register set. For this reason, no idle time is generated between the completion of DMA data transfer and the start of next DMA data transfer, and successive DMA data transfer can be executed continuously.

Accordingly, MPEG 2 motion picture data stored in the DVD can be continuously transferred to the DVD decoder 18 to prevent distortion of a reproduced image and frame omission.

Figure 6:
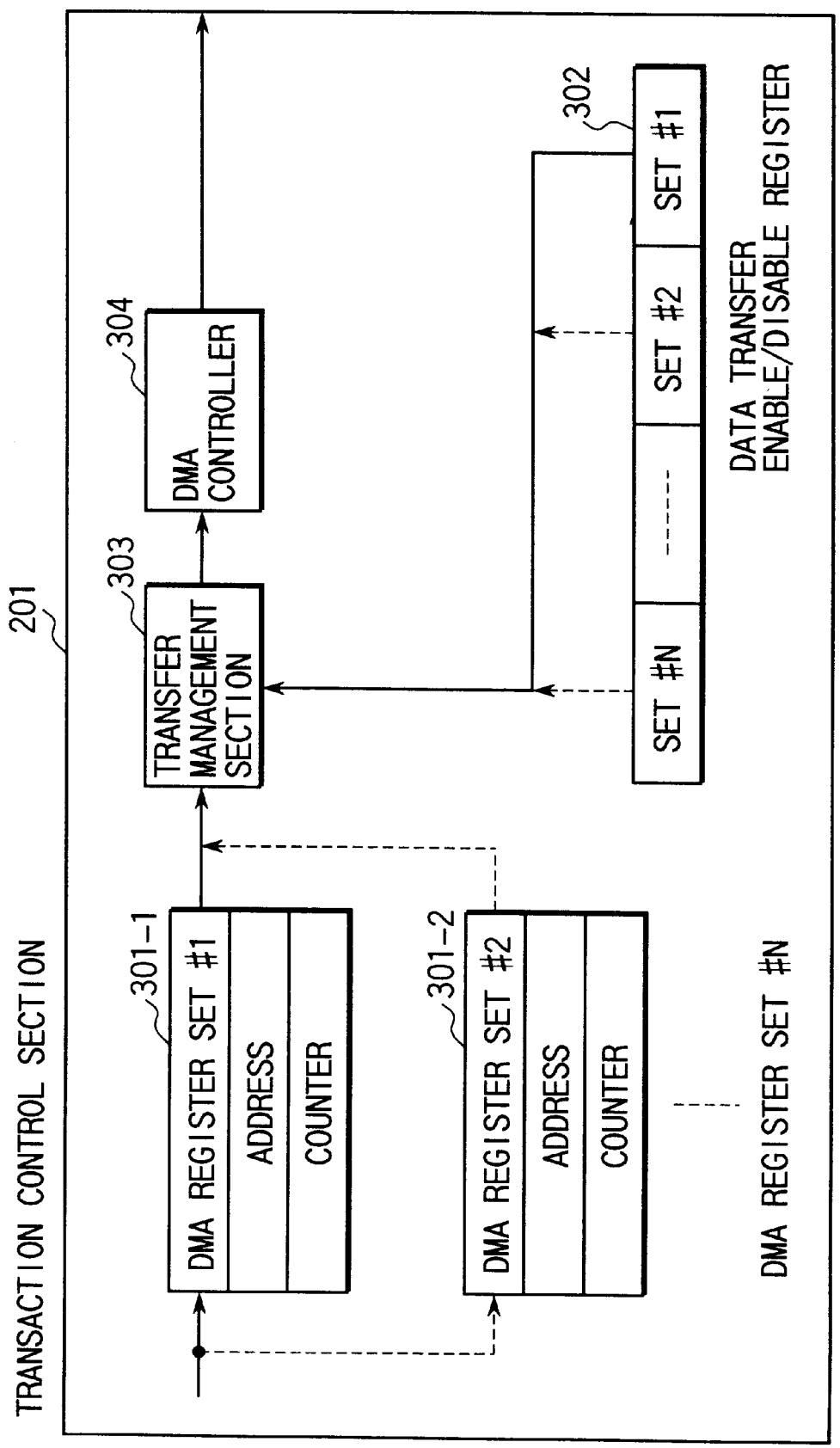
FIG. 6 is a block diagram showing an example of the detailed arrangement of a transaction control section arranged inside the DVD decoder used in the system of this embodiment.

Note that the DMA controller 304 itself may comprise the function of the transfer management section 303 in FIG. 6.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A DMA data transfer apparatus performing a data transfer between a memory of a computer system and an I/O device, comprising:

a plurality of programmable register sets arranged for one data transfer channel between said memory and said I/O device, each register set having a parameter set necessary for performing the data transfer of said one data transfer channel; and data transfer means for referring to said register sets in a predetermined order to execute a plurality of data transfers, said data transfer means starting a next data transfer set upon completion of current data transfer which is in accordance with contents of one register set.

2. An apparatus according to claim 1, further comprising a programmable control register in which transfer control data that respectively designate enable/disable states of said register sets in accordance with contents of said register sets are set, and wherein said data transfer means comprises:

execution means for, every time the parameter set is input from one of the programmable register sets, executing one data transfer in accordance with the input parameter set; and means for referring to the transfer control data set in said programmable control register, and every time one data transfer by said execution means is completed, inputting contents of a next programmble register set permitted for a next data transfer to said execution means to start the next data transfer.

3. An apparatus according to claim 2, wherein the parameter set comprises a start memory address value subjected to DMA data transfer, and a transfer count value indicating a data transfer width.

4. An apparatus according to claim 2, wherein the parameter set comprises a start memory address value subjected to DMA data transfer, and an end memory address value.

5. An apparatus according to claim 1, wherein the parameter set comprises a start memory address value subjected to DMA data transfer, and a transfer count value indicating a data transfer width.

6. An apparatus according to claim 1, wherein the parameter set comprises a start memory address value subjected to DMA data transfer, and an end memory address value.

7. A method of controlling a data transfer apparatus performing a data transfer between a memory of a computer system and an I/O device, the data transfer apparatus comprising
a plurality of programmable register sets arranged for one data transfer channel between said memory and said I/O device, each register set having a parameter set necessary for performing the data transfer for said one data transfer channel, and
data transfer means for referring to said register sets in a predetermined order to execute a plurality of continuous data transfers, said data transfer means starting a next data transfer in accordance with contents of another register set upon completion of current data transfer which is in accordance with contents of one register set, the method comprising the steps of:
setting start memory address values and transfer count values to said register sets; and
when one data transfer based on the start memory address value and the transfer count value set to one of said register sets by said data transfer means is completed, setting a new parameter set necessary for a new data transfer to the one of said register sets.

8. A method according to claim 7, wherein the parameter set comprises a start memory address value subjected to DMA data transfer, and a transfer count value indicating a data transfer width.

9. A method according to claim 7, wherein the parameter set comprises a start memory address value subjected to DMA data transfer, and an end memory address value.

10. A method of controlling a data transfer apparatus performing a data transfer between a memory of a computer system and an I/O device, the data transfer apparatus comprising
a plurality of programmable register sets arranged for one data transfer channel between said memory and said I/O device, each register set having a parameter set necessary for performing the data transfer for said one data transfer channel,
a programmable control register in which transfer control data that respectively designate enable/disable states of said register in accordance with contents of said register sets are set,
execution means for, every time a start memory address and a transfer count value are input, executing the data transfer in accordance with the input parameter set, and
means for referring to the transfer control data set in said programmable control register, and every time the data transfer by said execution means is completed, inputting contents of a next programmable register set permitted for a next data transfer to said execution means to start the next data transfer, the method comprising the steps of:
setting parameter sets in said register set; plurality of DMA setting register sets;
setting, in said control register, transfer control data indicating permission of the data transfer in accordance with one of said register sets having a parameter set;
when the data transfer based on the start memory address value and the transfer count value seto to one of the said register sets by said data means is completed, setting a new parameter set necessary for the next data transfer to the one of said register sets; and
setting, in said control resister, transfer control data indicating permission of data transfer in accordance with the one of the said register sets having the new parameter set.

11. A method according to claim 10, wherein the parameter set comprises a start memory address value subjected to DMA data transfer, and a transfer count value indicating a data transfer width.

12. A method according to claim 10, wherein the parameter set comprises a start memory address value subjected to DMA data transfer, and an end memory address value.

13. A motion picture decoding apparatus for reading motion picture data loaded in a memory of a computer system from a storage medium storing digitally compressed/encoded motion picture data, from said memory by DMA data transfer, and decoding the motion picture data, comprising:
a decoder for decoding the motion picture data;
a plurality of programmable register sets arranged for one data transfer channel between said memory and said decoder, each register set having a parameter set necessary for performing the data transfer of said one data transfer channel; and
data transfer means for referring to said register sets in a predetermined order, and executing a plurality of data transfers to transfer the motion picture data of a plurality of area in said memory to said decoder, said data transfer means starting data transfer in accordance with contents of a next register set upon completion of data transfer in accordance with contents of one register set.

14. An apparatus according to claim 13, further comprising a programmable control register in which transfer control data that respectively designate enable/disable states of said register sets in accordance with contents of said register sets are set, and
wherein said data transfer means comprises:
execution means for, every time the parameter set necessary for a data transfer is input, executing the data transfer in accordance with the input parameter set; and
means for referring to the transfer control data of said control register, and every time one data transfer by said execution means is completed, inputting contents of a next register set permitted for a next data transfer to said execution means to start the next data transfer.

15. An apparatus according to claim 14, wherein the parameter set comprises a start memory address value subjected to DMA data transfer, and a transfer count value indicating a data transfer width.

16. An apparatus according to claim 14, wherein the parameter set comprises a start memory address value subjected to DMA data transfer, and an end memory address value.

17. An apparatus according to claim 13, wherein the parameter set comprises a start memory address value subjected to DMA data transfer, and a transfer count value indicating a data transfer width.

18. An apparatus according to claim 13, wherein the parameter set comprises a start memory address value subjected to DMA data transfer, and an end memory address value.

19. An apparatus according to claim 13, wherein said storage medium stores a plurality of video image data having angles different from each other which are multiplexed into one motion picture data stream in units of predetermined data blocks, and further comprising means for controlling setting of parameter sets necessary for DMA data transfer for said plurality of DMA setting register sets on the basis of a storage location of each block data for video image data of a predetermined angle in said memory so as to successively transfer, of the motion picture data stream read in said memory, only the block data about the video image data of the predetermined angle to be decoded to said decoder.

20. An apparatus according to claim 19, wherein the parameter set comprises a start memory address value subjected to DMA data transfer, and a transfer count value indicating a data transfer width.

21. An apparatus according to claim 19, wherein the parameter set comprises a start memory address value subjected to DMA data transfer, and an end memory address value.

* * * * *

UNITED STATES PATENT AND TRADEMARK OFFICE
CERTIFICATE OF CORRECTION

PATENT NO. : 6,111,592
DATED : August 29, 2000
INVENTOR(S) : Hideki Yagi

It is certified that error appears in the above-identified patent and that said Letters Patent is hereby corrected as shown below:

Column 10,
Line 58, "programmble" should read -- programmable --
Lines 63 and 67, before "data", delete "DMA"

Column 11,
Lines 3, 7 and 37, before "data", delete "DMA"
Line 50, "register in" should read -- register sets in --
Line 62, "set" should read -- sets --
Lines 62-63, delete "plurality of DMA setting register sets;"

Column 12,
Line 2, "seto" should read -- set --
Line 3, "data means" should read -- data execution means --
Line 7, "resister" should read -- register --
Lines 12, 54, 58, 62 and 66, before "data", delete "DMA"
Line 19, after "storing", delete "digitally"
Line 20, after "by", delete "DMA"
Line 32, "area" should read -- areas --

Column 13,
Line 7, before "data", delete "DMA"
Line 8, delete "plurality of DMA setting"

Column 14,
Lines 5 and 9, before "data", delete "DMA"

Signed and Sealed this

Second Day of November, 2004

JON W. DUDAS
*Director of the United States Patent and Trademark Office*